(12) United States Patent
Swartz (10) Patent No.: US 8,491,430 B1
(45) Date of Patent: Jul. 23, 2013

(54) ROLLER CHAIN ASSEMBLY

(76) Inventor: Kevin Eugene Swartz, Watsontown, PA (US)

(*) Notice: Subject to any disclaimer, the term of this patent is extended or adjusted under 35 U.S.C. 154(b) by 346 days.

(21) Appl. No.: 12/916,884

(22) Filed: Nov. 1, 2010

Related U.S. Application Data (60) Provisional application No. 61/297,497, filed on Jan. 22, 2010.

(51) Int. Cl.
*F16H 7/24* (2006.01)
*F16H 7/00* (2006.01)
*F16H 7/06* (2006.01)
*F16G 13/02* (2006.01)

(52) U.S. Cl.
USPC ............ 474/150; 474/148; 474/156; 474/206

(58) Field of Classification Search
USPC ................ 474/148, 149, 150, 155, 156, 206, 474/231
See application file for complete search history.

(56) References Cited

U.S. PATENT DOCUMENTS

| | | | |
|---|---|---|---|
| 3,285,485 A | 11/1966 | Slator | |
| 3,325,977 A | 6/1967 | Kirsten | |
| 3,344,677 A * | 10/1967 | Morse | 474/148 |
| 3,952,861 A | 4/1976 | Holmqvist et al. | |
| 4,047,452 A | 9/1977 | Eddy | |
| 4,422,541 A | 12/1983 | Lisec | |
| 4,469,267 A * | 9/1984 | Franchuk et al. | 226/172 |
| 4,585,061 A | 4/1986 | Lyons et al. | |
| 4,655,291 A | 4/1987 | Cox | |
| 4,964,447 A | 10/1990 | Farrell et al. | |
| 5,188,174 A | 2/1993 | Anderson, Jr. | |
| 5,335,780 A | 8/1994 | Watson | |
| 5,775,417 A * | 7/1998 | Council | 166/77.3 |
| 5,895,193 A | 4/1999 | Ung | |
| 5,924,551 A | 7/1999 | Radmall | |
| 5,975,203 A * | 11/1999 | Payne et al. | 166/77.3 |
| 6,471,050 B2 | 10/2002 | Ikeda et al. | |
| 6,880,629 B2 * | 4/2005 | Schroeder | 166/77.3 |
| 7,434,679 B2 | 10/2008 | Swartz | |
| 2009/0124444 A1* | 5/2009 | Soerensen | 474/206 |

* cited by examiner

*Primary Examiner* — William E Dondero
*Assistant Examiner* — Minh Truong
(74) *Attorney, Agent, or Firm* — Hooker & Habib, P.C.

(57) ABSTRACT

A roller chain assembly includes an attachment chain having links that carry bent leg plates extending over a frame. The leg plates each carry a number of roller pins supporting the plate against the frame at predetermined, multiple points on the plate. The chain links have connecting pins extending outwardly from the chain links that are received in grooves formed in the frame.

25 Claims, 15 Drawing Sheets

ROLLER CHAIN ASSEMBLY

FIELD OF THE DISCLOSURE

The present disclosure relates generally to roller chain assemblies in which a roller chain extends between a pair of sprockets mounted in a frame.

BACKGROUND OF THE DISCLOSURE

My U.S. Pat. No. 7,434,679 incorporated fully herein by reference discloses a roller chain assembly in which a roller chain extends between upper and lower sprockets mounted on the ends of a frame. The roller chain includes bent leg plates that extend over the frame. The leg plates are supported against the frame by bearing surfaces formed as sets of pins rotatably mounted on the frame. The pins are spaced along the frame and are preferably spaced such that each leg plate is instantaneously supported by at least two pins.

Because the pin spacing is predetermined, the size and spacing of the leg plates must be compatible with the pin spacing to enable instantaneous support of each leg plate by at least two pins.

It is desired to improve the above roller chain assembly so that the frame can be used independently of the size and spacing of the link plates. It is also desirable that the roller chain assembly better resist loads urging a portion of the chain away from the frame so that the roller chain assembly can be used in more applications and broader working environments.

BRIEF SUMMARY OF THE DISCLOSURE

Disclosed is an improved roller chain assembly that enables a frame to be used essentially independently of the size and spacing of the bent leg plates. In a preferred embodiment, the improved chain assembly also better resists loads urging the chain away from the frame.

An embodiment of a roller chain assembly includes bearings carried by each bent leg plate. The bearings are preferably formed as rotatable pins that extend away from the leg plate and support the leg plate against the frame. Because each leg plate preferably carries a number of bearings, it is assured that each leg plate has at any instant multiple points of support against the frame independent of the size and spacing of the bent leg plates.

In yet other embodiments the connecting pins connecting the chain link plates extend outwardly from the link plates and are closely received in a groove formed in the frame. Contact of the connecting pin extending portions with the wall defining the groove resists movement of the chain links away from the frame. This enables the roller chain assembly to be used in a broader array of working environments.

Carrying the bearings or pins on the bent leg plates rather than mounting the pins at fixed locations on the frame assures the bent leg plate has predetermined multiple points of support against the frame independent of the frame construction. The frame is therefore usable with a wider variety of roller chains, and so the roller chain assembly can be better adapted to a particular use.

Other objects and features of the disclosure will become evident as the description proceeds, especially when taken in conjunction with the accompanying drawing sheets illustrating one or more embodiments.

DETAILED DESCRIPTION OF THE PREFERRED EMBODIMENT

FIGS. 1-4 and 15 illustrate a traction subassembly 1 for a motorized ground vehicle that employs a roller chain assembly 10. The convex portion 12 of the roller chain assembly 10 contacts the ground and the roller chain assembly 10 is driven by a motor 2 to propel the vehicle along the ground.

The roller frame assembly 10 includes a frame 14 that rotatably supports first and second toothed sprockets 16, 18 mounted on the ends of the frame. A roller chain 20 extends around the frame 14 and engages the sprockets 16, 18 to be driven by the sprockets. The frame 14 is formed in two frame halves 21, 22 to facilitate assembly of the assembly 10, with locating pins 24 closely received in sockets 26 formed in each frame half. When assembled, the two frame halves 21, 22 define a recessed center channel 28 that extends around the outer periphery of the frame 14 and receives a portion of the roller chain 20.

A number of spaced-apart grip plates or tread plates 30 are attached to the roller chain 20 on the side away from the frame 14. The tread plates 30 each have a flat, rectangularly shaped outer surface. The tread plates 30 engage the ground and generate traction when the roller chain 20 is driven by the motor. Other plate configurations can be used in other embodiments of the roller chain assembly 10 to best suit the intended use of the roller chain assembly.

FIGS. 5-14 illustrate a portion of the roller chain 20. The roller chain 20 is essentially a conventional small-pitch attachment chain with modifications as will be described in further detail below. The illustrated roller chain 20 is based on an ANSI No. 50 chain having a 15.875-millimeter pitch, but other sizes and styles of chain can be used for alternative embodiments of the invention.

The roller chain 20 includes sets of conventional interconnected pin links 32 and roller links 34, the end of each pin link 32 interconnected with the end of an adjacent roller link 34. The pin links 32 and the roller links 34 mesh with the teeth of the sprockets 16, 18 in a conventional manner as is well known in the art.

Only one interconnected pin link and roller link is shown in FIGS. 5-14, it being understood that the roller chain 20 is formed from many such links 32, 34. Each pin link 32 includes a pair of spaced apart pin link plates 36 that define opposite sides of the pin link 32, and each roller link 34 includes a pair of spaced apart roller link plates 38 that define opposite sides of the roller link 34. The pairs of roller link plates 38 are closely received between the adjacent pairs of pin link plates 36.

Figure 7:
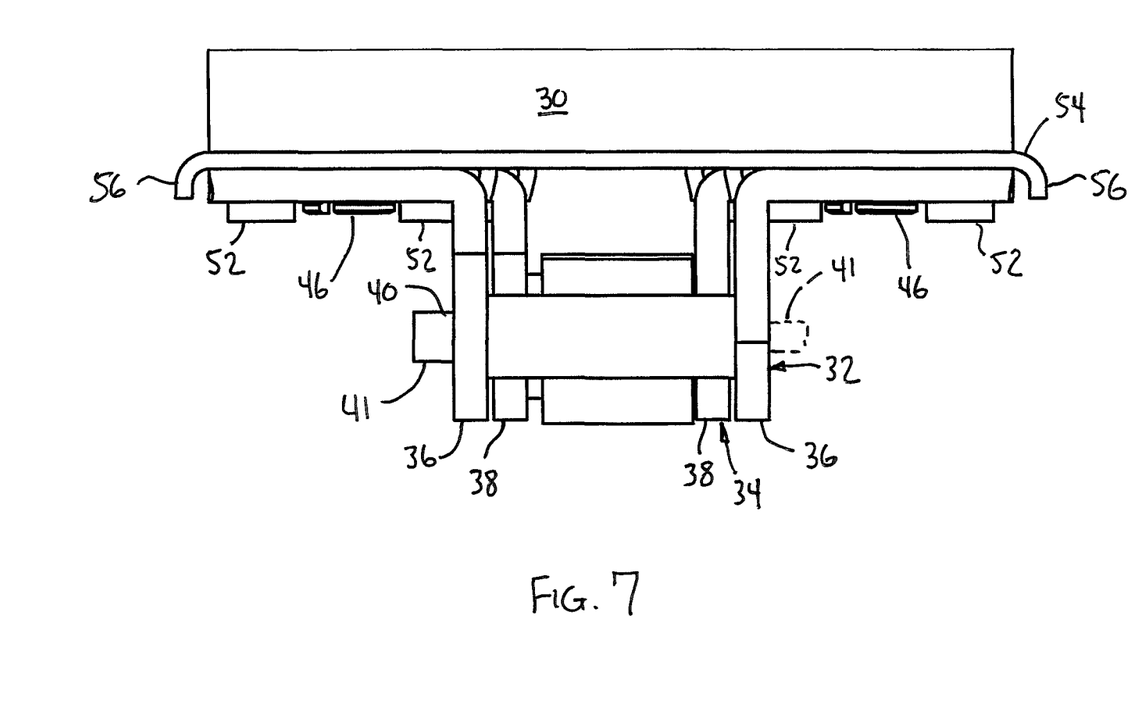
FIG. 7 is a front view of the roller chain portion shown in FIG. 5.

Each pin link 32 carries a pair of connection link pins 40. The link pins 40 differ from the link pins used in a conventional roller chain by having one end portion 41 of each of the pair of pins 40 extend a substantial distance (a substantial distance being a distance preferably greater than the radius of the pin, and preferably a distance greater than the diameter of the pin) outwardly from one side of the pin link 32. The illustrated link pin end portions 41 as viewed in FIG. 7 extend from the left side of the pin link 32. The link pin end portions 41 of the next successive pin link 32 would extend from the opposite, right side of that pin link as shown in phantom in FIG. 7. That is, the pairs of link pins 40 associated with respective pin links 32 alternately extend outwardly from opposite left and right sides of the pin links 32 when viewed as shown in FIG. 7.

The roller chain 20 includes bent link plates 42, 44 that is perpendicular to and extends outwardly away from the pin links 32, 34. Each bent link plate 42, 44 is integrally formed with a respective link plate 36, 38 for conjoint movement with the chain links 32, 34. Each pin link 32 and roller link 34 therefore carries pair of like bent leg plates 42, 44 respectively that are coplanar and extend outwardly away from opposite sides of the chain link. The bent leg plates 42, 44 on each side of the roller chain 20 extend to free ends that are spaced a uniform distance from the centerline of the roller chain 20.

The pair of bent leg plates 42, 44 of each chain link 32, 34 carries a respective tread plate 30, the tread plate 30 attached to the pair of plates 42, 44 by a pair of rivets 46.

Figure 8:
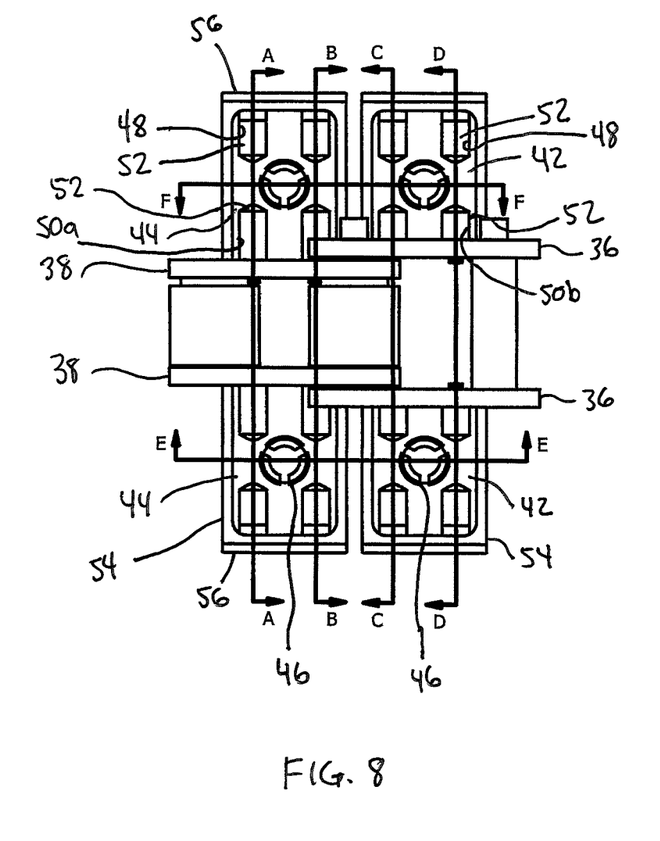
FIG. 8 is a bottom view of the roller chain portion shown in FIG. 5.

As best seen in FIG. 8, each bent leg plate 42, 44 has a pair of through slots or bores 48, 50 that extend along axial centerlines at right angles to the link plates from opposite ends of the bent leg plate 42 or 44. Each bore 48, 50 is formed to closely receive a circular pin 52 that has a diameter substantially greater than the thickness of the bent leg plate 42, 44. The bores 48, 50 are each sized to enable the pin 52 carried in the bore 48, 50 to rotate within the bore, with the axis of rotation being the centerline of the bore.

The respective pairs of bores 48, 50 in each bent leg plate 42, 44 are spaced apart in a direction perpendicular to the bore axis. Each bore 48 is also coaxial with a respective bore 50. The axial centerlines of the bores 48, 50 are located so that the bores 48, 50 are essentially tangential with the upper surface of the bent legs plates 42, 44.

The bores 48 extend axially inwardly a uniform distance from the free end of the plate 42, 44. The bores 50 extend axially outwardly from the opposite end of the plate and each bore 50 ends the same distance from the free end of the plate. The bores 50 in the leg plates 44 are longer than the bores 50 in the leg plates 42 to compensate for the roller link offset. The rivet 46 extending through each bent leg plate 42, 44 is centered between the pairs of bores 48, 50 in the bent leg plate.

Figure 6:
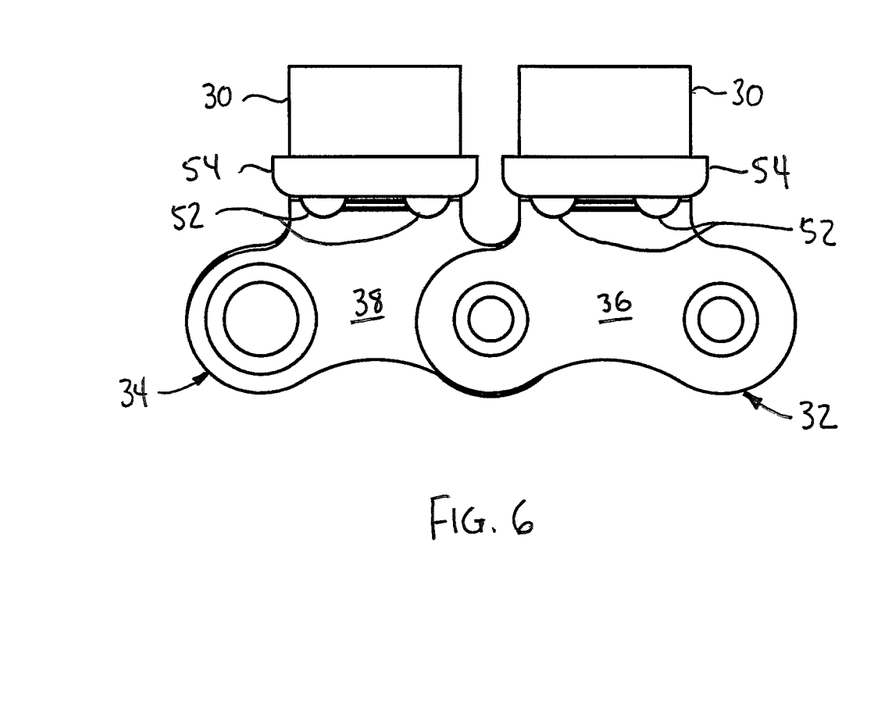
FIG. 6 is a side view of the roller chain portion shown in FIG. 5.
Figure 9:
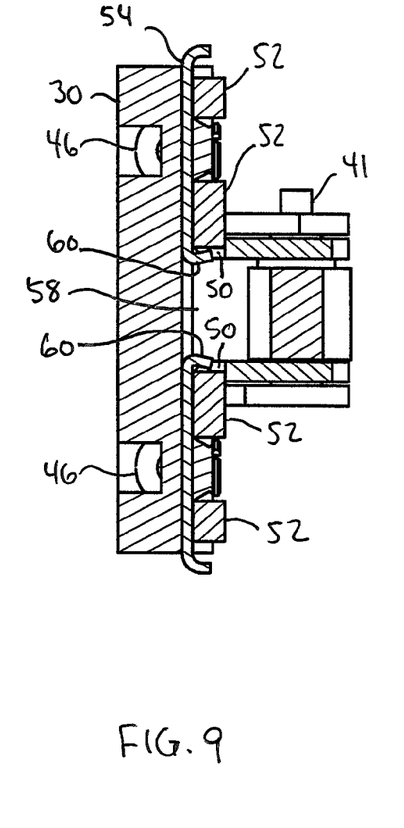
FIG. 9 is a sectional view taken along line A-A of FIG. 8.
Figure 10:
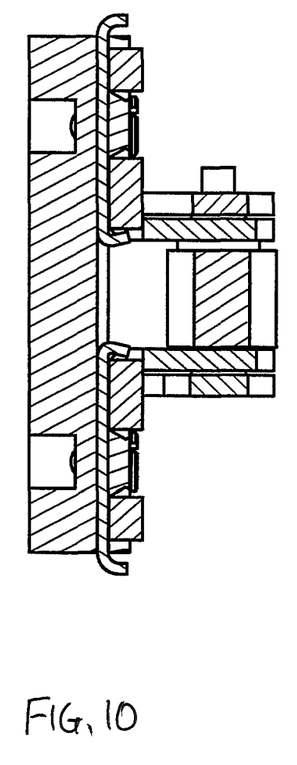
FIG. 10 is a sectional view taken along line B-B of FIG. 8.
Figure 11:
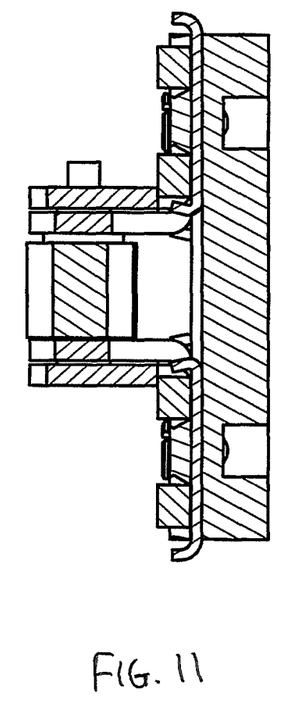
FIG. 11 is a sectional view taken along line C-C of FIG. 8.
Figure 12:
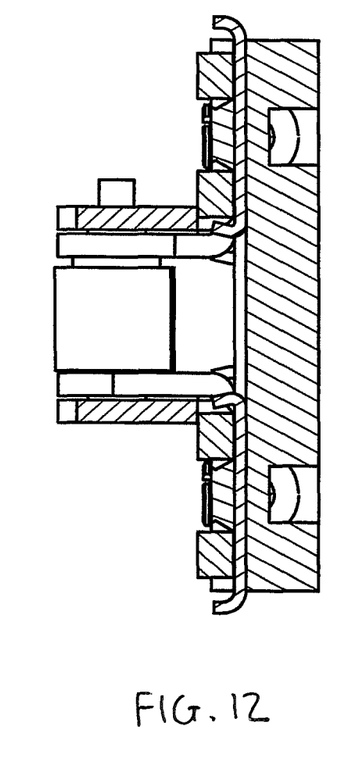
FIG. 12 is a sectional view taken along line D-D of FIG. 8.
Figure 13:
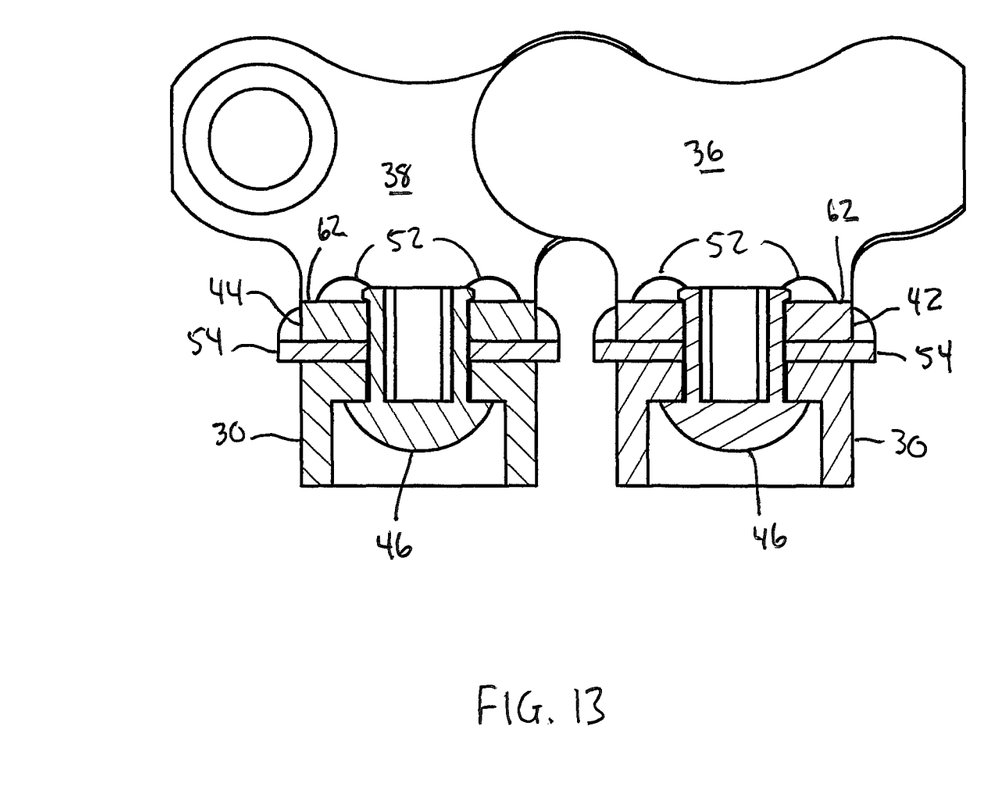
FIG. 13 is a sectional view taken along line E-E of FIG. 8.
Figure 14:
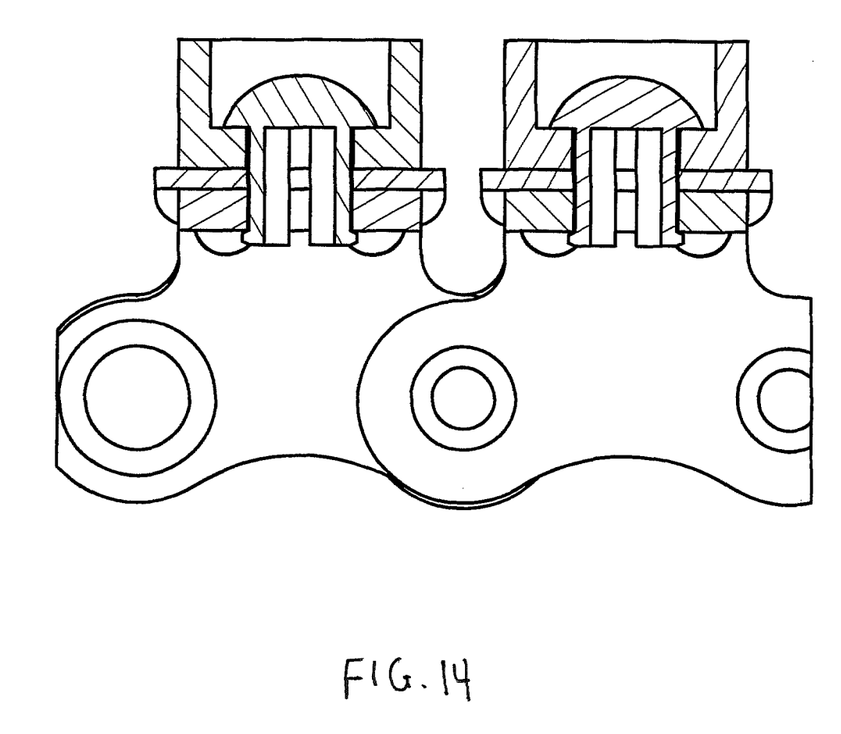
FIG. 14 is a sectional view taken along line F-F of FIG. 8.

Each bearing pin 52 has a circular cross section as best seen in FIG. 6. A flat cover plate 54 extends across the upper side of each pair of bent leg plates 42, 44 when viewed as shown in FIG. 7. The cover plate 54 extends beyond the outer perimeter of the bent leg plates 42, 44. The projecting end portions 56 of the cover plate 54 are bent down ninety degrees towards the bent leg plates 42, 44 and partially overlap the ends of the bent leg plates as shown in FIG. 7 to retain the pins 52 in the pin bores 48. The cover plate 54 also includes a central rectangular opening 58 disposed between the bent leg pins (see FIG. 9). The edges 60 extending along the plate opening 58 are curled down as shown in FIG. 9 and partially overlap the bent leg plates to retain the pins 52 in the pin bores 50. In the illustrated embodiment portions of the edges 60 extend into the pin bores 50.

As previously described, the diameter of each pin 52 is substantially greater than the thickness of the bent leg plate 42 or 44. As a result, each pin 52 extends outwardly beyond the outer perimeter side 62 (see FIG. 13) of the bent leg plate plates 42, 44. The rivets 46 also extend outwardly beyond the perimeter side 62 but do not extend as far as the pins 52.

Figure 15:
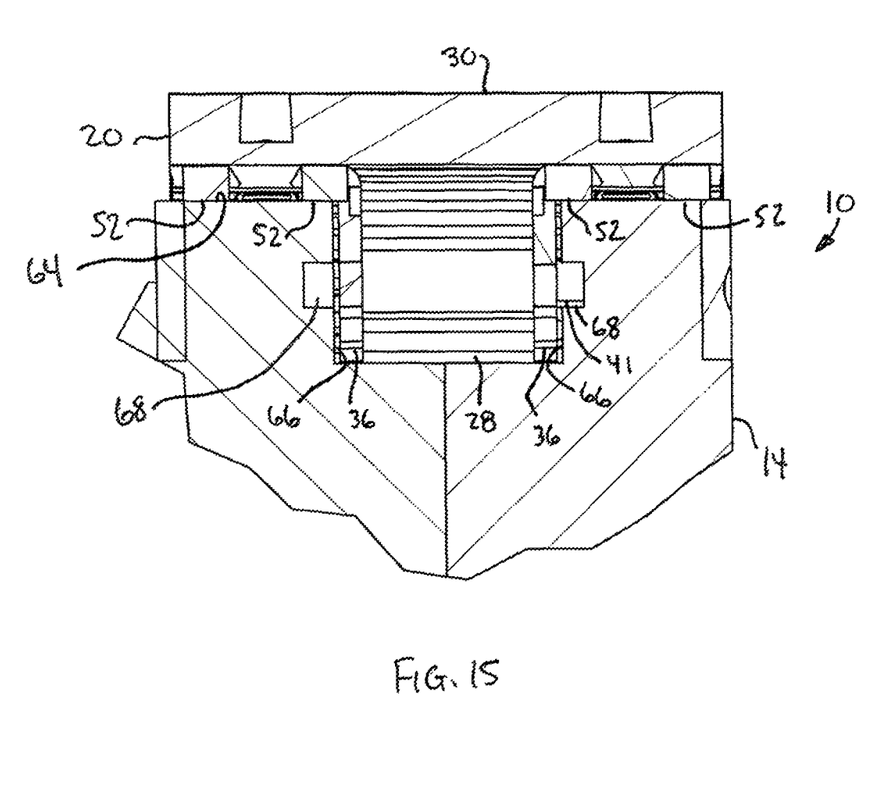
FIG. 15 is an enlarged view of detail S of FIG. 4.

FIG. 15 illustrates a portion of the assembled roller frame assembly 10. The roller chain 20 defines a loop extending around the frame 14, with the frame 14 within the loop. The sides 62 (see FIG. 13) of the bent leg plates 42, 44 face the inside of the loop. The pin bearings 52 are on the inside of the loop and support the roller chain 20 against a smooth outer surface 64 of the frame 14. The tread plates 30 are on the outside of the loop to engage the ground during operation of the traction subassembly 1 of FIG. 1.

The pin link plates 36 are received in the channel 28 and are parallel with and closely spaced from the parallel side walls 66 defining the channel 28. A groove 68 extends into each side wall 66 and closely receives the sets of left and right protruding link pin end portions 41.

When the roller chain assembly 10 is in use, the bent legs 42, 44 of the chain 20 are supported against the frame surface 64 by the bearing pins 52 acting as or forming roller bearings. The pins 52 provide line contact against the frame 14. Because the legs 42, 44 each carry multiple pins 52, it is assured that each leg 42, 44 is supported against the frame 14 at multiple predetermined points or lines of contact when exposed to loads urging the chain 20 against the frame 14. In the illustrated embodiment each bent link plate 42, 44 is supported at four different line locations.

Forces urging a portion of the chain 20 away from the frame 14 are resisted by the connecting pin end portions 41 engaging against the sides of the grooves 68. Under such operating conditions the pin end portions 41 act essentially as cam followers guided by a camming surface defined by the sides of the grooves 68.

Figure 1:
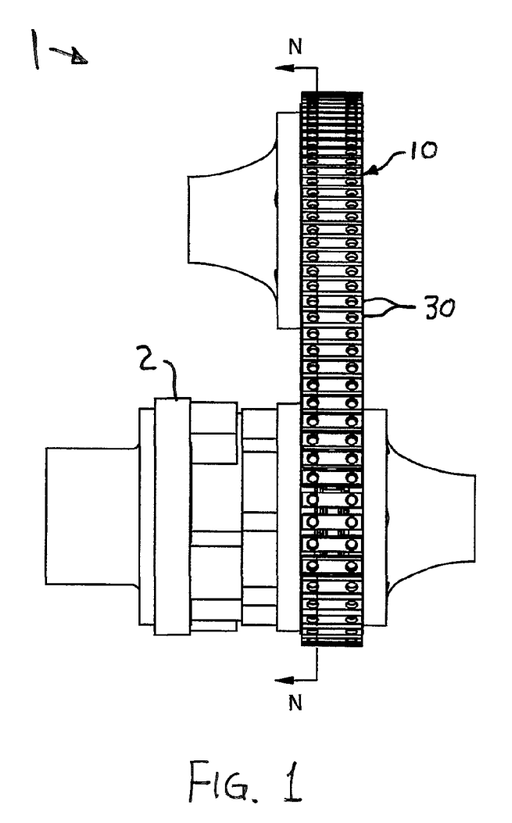
FIG. 1 is a side view of a traction drive incorporating an embodiment of a roller chain assembly.
Figure 2:
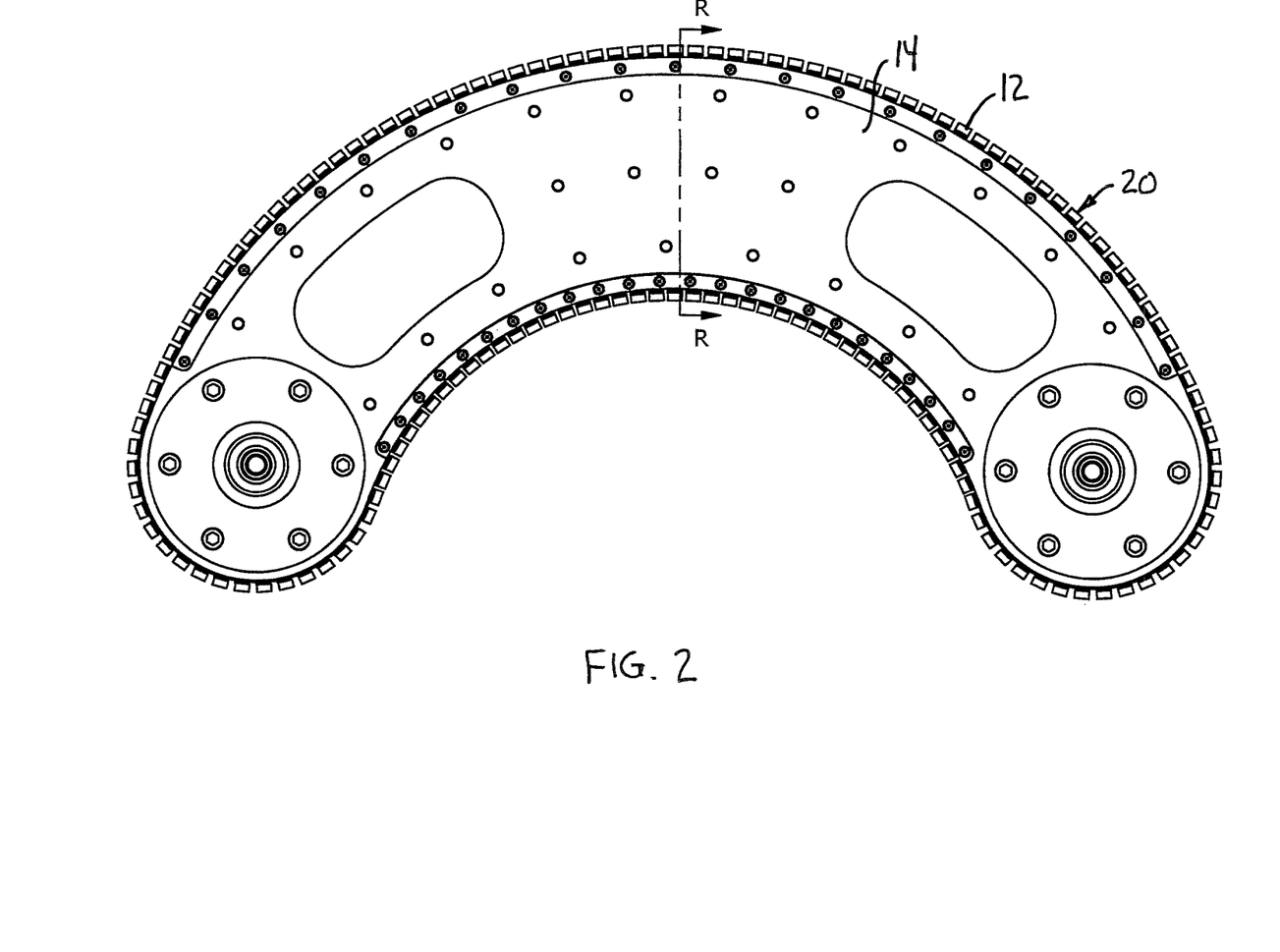
FIG. 2 is a front view of the traction drive shown in FIG. 1.
Figure 3:
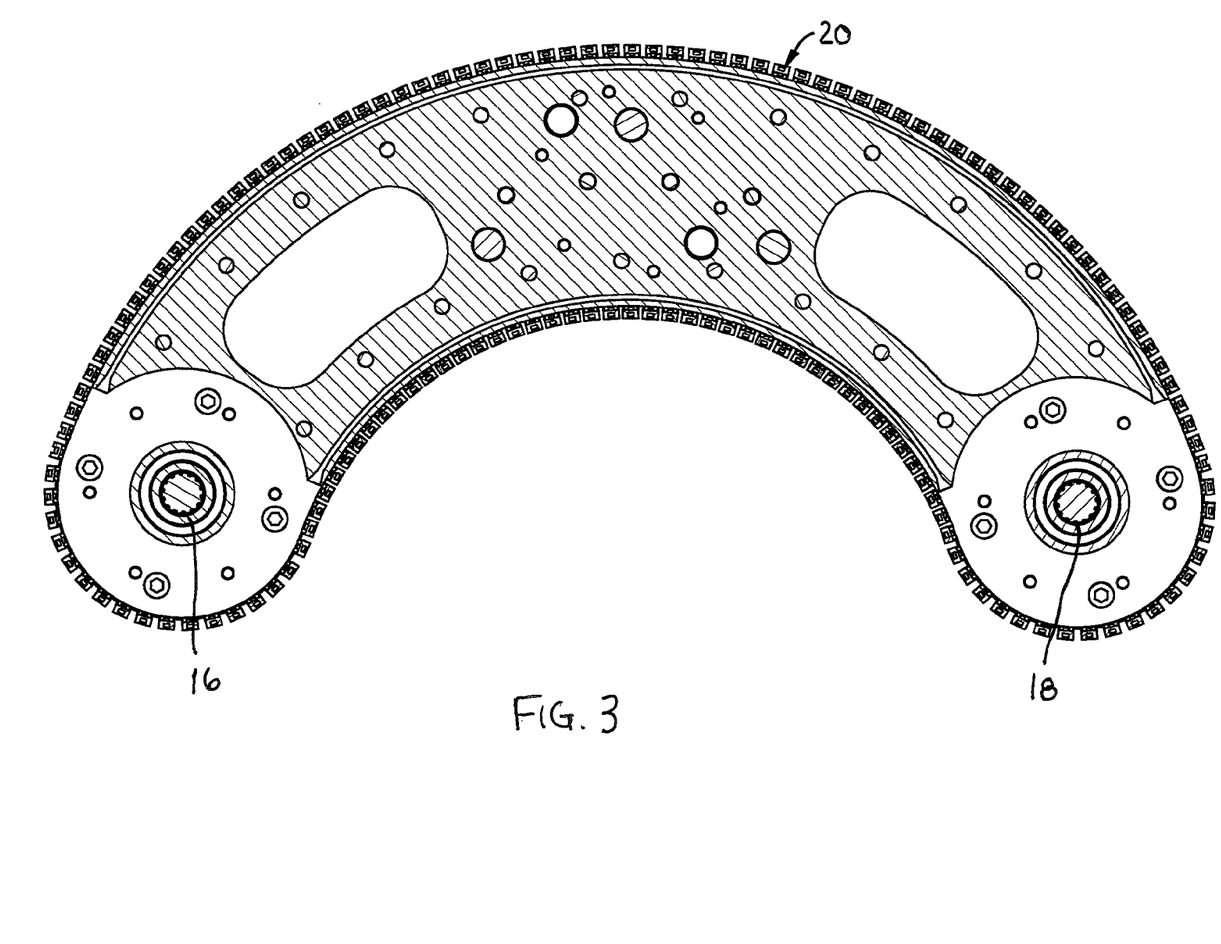
FIG. 3 is a sectional view taken along line N-N of FIG. 1.
Figure 4:
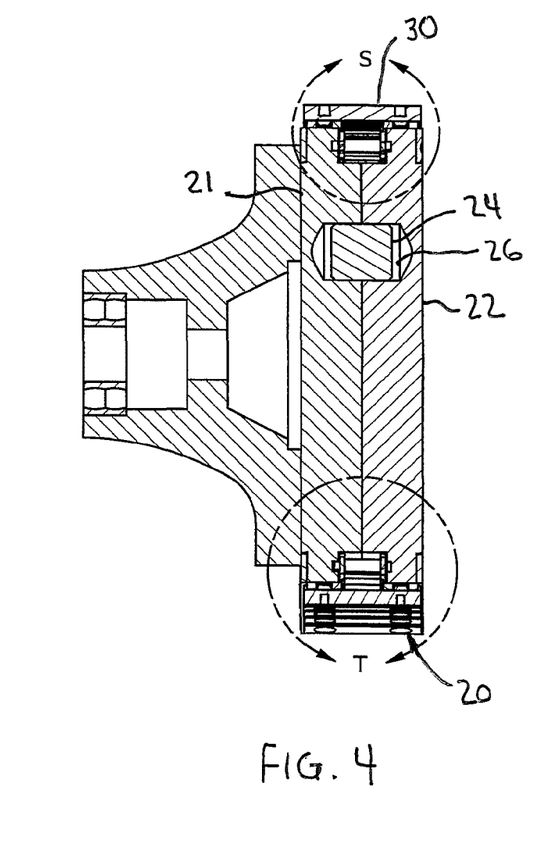
FIG. 4 is a sectional view taken along line R-R of FIG. 2.
Figure 5:
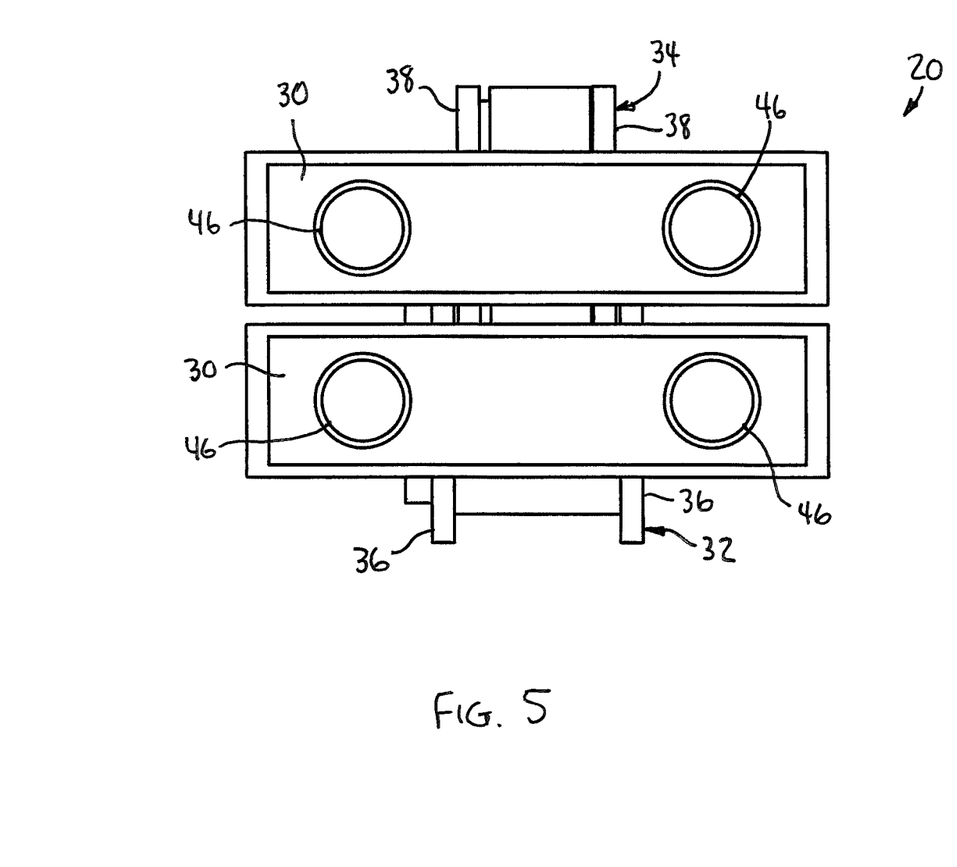
FIG. 5 is a top view of a portion of the roller chain used in the roller chain assembly shown in FIG. 1.

If a different roller chain 20 is used with the traction drive 1 (for example, for use when operating on a different soil type), the roller chain 20 will have multiple points of support against the frame as described above because the bearings 52 are supplied by the roller chain and not the frame.

The cover plate 54 is used to partially obstruct the pin bores 48, 52. In other embodiments a recess could be formed in the bent leg plates 42, 44 where the sets of respective pin bores 48, 50 enter into the leg plate and a retaining plate fitted in the recess to retain the pins 52 to at least partially obstruct the pin bores. The retaining plate can be fastened to the bent leg by spot welding or mechanical fastening.

The illustrated preferred embodiment of the roller chain assembly 10 is shown incorporated in a traction drive. It is anticipated, however, that the roller chain assembly 10 can be used in many other types of applications and working environments (including off-Earth applications).

While this disclosure discloses one or more embodiments, it is understood that this is capable of modification, and I therefore do not wish to be limited to the precise details set forth, but desire to avail myself of such changes and alterations as fall within the purview of the following claims.

What I claim as my invention is:
1. A roller chain assembly comprising:
 a frame;
 a pair of sprockets rotatably mounted on the frame, each sprocket rotatable about a respective axis of rotation;

a roller chain extending around the frame and engaging the sprockets to be driven by the sprockets;

the roller chain comprising a plurality of interconnected chain links and a plurality of first plates rigidly attached to the chain links for conjoint movement with the chain links;

each chain link comprising spaced-apart first and second walls configured to receive a sprocket therebetween for engaging the sprocket, the first and second walls spaced apart in a first direction that, when the chain link is engaged with one of the sprockets, is parallel with the axis of rotation of the engaged sprocket;

the roller chain defining a loop extending around the frame, the frame comprising an outer peripheral surface fixed with respect to said axes of rotation, the surface extending between the sprockets and facing a portion of the loop;

each first plate attached to and extending from a respective first wall of the chain link, the first plate extending outwardly beyond the chain link away from the walls in a direction parallel with said first direction;

each first plate having a first side on a radially inner side of the loop and an opposite second side, the first side of the plate facing the surface of the frame when the plate is located in said portion of the loop;

each first plate comprising a plurality of bearings mounted to the first side for conjoint movement of the bearings with the first plate, the bearings spaced apart from one another and extending away from the first side of the plate in a second direction substantially perpendicular with the first direction, the bearings engagable against the surface of the frame when the first plate is located in said loop portion and is being urged towards the frame whereby the bearings support the first plate against deflection towards the surface of the frame and space the first side of the plate from the frame surface if the bearings engage the surface of the frame.

2. The roller chain assembly of claim 1 wherein the plurality of bearings of each first plate are pins rotatably mounted on the first plate, the pins disposed to contact the surface of the frame when the first plate is located in said portion of the loop and the first plate is being urged towards the frame.

3. The roller chain assembly of claim 2 wherein each pin of each first plate is carried within a respective bore formed in the first plate.

4. The roller chain assembly of claim 3 wherein each first plate includes a cover covering the second side of the first plate, the cover comprising folded portions that each at least partially obstruct an open end of a respective bore to resist having the pins fall out of the bores.

5. The roller chain assembly of claim 4 wherein the bearings comprise four pins and the first plate comprises a first pair of openings and a second pair of openings formed therein, each pin mounted in a respective opening, the first pair of openings extending into the first plate from a first side of the first plate, the second pair of the openings extending into the first plate from a second side of the first plate opposite the first side of the first plate, the cover folded portions comprising a first pair of folded portions adjacent the first side of the first plate and configured to at least partially obstruct removal of the bearings in the first pair of openings and a second pair of folded portions adjacent the second side of the first plate and configured to at least partially obstruct removal of the bearings in the second pair of openings.

6. The roller chain assembly of claim 1 wherein each chain link comprises a second plate attached to and extending from the second wall of the chain link, the second plate being similar to the first plate but extending away from the first and second walls of the chain link parallel with said first plate.

7. The roller chain assembly of claim 6 wherein the first wall and the first plate of each chain link is formed as an integral "L"-shaped first member having two legs and the second wall and the second plate of the chain link is formed as an integral "L"-shaped second member having two legs;

the bearings of each first plate and second plate comprise first and second pairs of cylindrical members extending along respective cylinder axes, each cylindrical member rotatably mounted to the plate for rotation about the cylinder axis, the first pair of cylindrical members disposed in a first pair of bores opening into a first end of one leg of the "L" and the second pair of cylindrical members disposed in a second pair of bores opening into an opposite second end of the one leg of the "L";

the roller chain assembly further comprises a cover that comprises a first cover portion that covers the first and second plates and first and second pairs of abutment members extending from the first cover portion, the first pair of abutment members extending from respective opposite ends of the first portion of the cover into a space between the first and second plates to at least partially obstruct the open ends of the first pairs of bores in the first and second plates, the second pair of abutment members extending over the open ends of the second pairs of bores in the first and second plates to partially obstruct the open ends of the second pairs of openings in the first and second plates.

8. The roller chain assembly of claim 1 wherein the frame comprises a recess extending along a side of said frame surface, the walls of each chain link while in said loop portion at least partially disposed in the recess with the first plate attached to the chain link outside of the recess.

9. The roller chain assembly of claim 8 wherein the frame comprises a wall facing the recess and a groove formed in said recess wall;

the chain links of the roller chain are interconnected by a plurality of link pins, each link pin interconnecting a respective pair of adjacent chain links and extending along an axis parallel with the first direction;

each link pin having one end portion adjacent the first walls of the interconnected pair of chain links and an opposite end portion adjacent the second walls of the interconnected pair of chain links;

at least some of the link pins of said plurality of link pins are a first set link pins, each link pin of said first set of link pins extending along the pin axis away from the interconnected pair of chain links outwardly from the first walls of the chain links and configured to extend into the groove formed in the frame sidewall when the first and second walls of the pair of chain links interconnected by the link pin are disposed at least partially in said recess.

10. The roller chain assembly of claim 9 wherein the frame comprises a second wall facing the recess opposite the first recess wall, a second groove formed in the second recess wall, and the other link pins of said plurality of link pins are a second set of link pins, each link pin of the second set of link pins extending along the pin axis outwardly away from the second walls of the pair of chain links interconnected by the link pin and configured to extend into the second groove when the first and second walls of the pair of chain links interconnected by the link pin are disposed at least partially in said recess.

11. The roller chain assembly of claim 10 wherein the first set of link pins alternates with the second set of link pins along the length of the roller chain.

12. The roller chain assembly of claim 1 wherein the first side of each first plate comprises a planar surface that faces the frame surface while the plate is in said loop portion.

13. The roller chain assembly of claim 1 wherein each bearing is configured and disposed such that, each instant that the bearing is in contact against the frame surface such instantaneous contact between the surface and the bearing extends along a line on the bearing.

14. The roller chain assembly of claim 1 comprising a plurality of additional members, each additional member attached on a respective chain link and disposed on the outside of the roller chain loop.

15. The roller chain assembly of claim 14 wherein each additional member is attached to a respective chain link by a fastener extending through the first plate, the fastener having a head against the first side of the first plate, the fastener head having a thickness extending away from the first side of the first plate in the same direction as the bearings on the first plate extend from the first side of the plate, the fastener head not extending beyond any of the bearings.

16. The roller chain assembly of claim 1 wherein the bearings comprise four bearings disposed at the vertices of a rectangle.

17. The roller chain assembly of claim 16 wherein the four bearings are formed as a first pair of bearing pins rotatably mounted on the first plate and a second pair of bearing pins rotatably mounted to the first plate, the first pair of bearing pins mounted for rotation on a common first axis, the second pair of bearing pins mounted for rotation on a common second axis spaced from and parallel with the common first axis, the common first axis extending parallel with the first direction.

18. The roller chain assembly of claim 1 wherein the first and second walls of each chain link are interconnected to the first and second walls of an adjacent chain link by a link pin that extends from the chain link into a recess formed in the portion of the frame facing the loop portion while the chain link is in the loop portion.

19. A roller chain capable of being driven by a sprocket having teeth rotating about an axis of rotation, the roller chain comprising:
  a plurality of interconnected chain links and a plurality of plates rigidly attached to the chain links for conjoint movement with the chain links, the chain links defining a loop;
  each chain link comprising first and second walls spaced apart from one another to receive a sprocket tooth between said walls to drive the roller chain;
  each plate attached to and extending from the first wall of a respective chain link and extending outwardly beyond the walls of the chain link in an axial direction parallel with the sprocket axis when the chain link is receiving the sprocket and having a first side on a radially inner side of the loop, each plate comprising a plurality of spaced-apart bearings mounted to the first side of the plate, each bearing extending away from the first side of the plate to an end spaced away from the first side of the plate.

20. The roller chain of claim 19 wherein each bearing is rotatably mounted to the plate for rotation parallel to said axial direction.

21. The roller chain of claim 20 wherein the plurality of bearings of each plate comprise a first pair of spaced apart bearings rotatable about a first common axis of rotation and a second pair of spaced apart bearings rotatable about a second common axis spaced from the first common axis.

22. The roller chain of claim 19 wherein the plurality of bearings of each plate comprise a pair of bearings, each bearing of the pair of bearings rotatable about a respective axis of rotation, the bearing axes parallel to one another and spaced apart from one another in a direction transverse to the axes.

23. The roller chain of claim 19 wherein the chain links are interconnected by pins that extend along a pin axis between the first and second walls of the chain links, each pin interconnecting one pair of said chain links and having an end portion extending axially a substantial distance away from the pair of chain links to a free end spaced from the pair of interconnected chain links.

24. The roller chain of claim 23 wherein the chain links comprise roller links and pin links alternately spaced along the length of the chain, the first and second walls of each roller link disposed between the first and second walls of the adjacent pin links, each pin link connected to an adjacent pair of roller links by a pair of the pins, the pair of pins extending away from the roller links attached to the pin link.

25. The roller chain of claim 24 wherein the first and second walls of each chain link are located on first and second sides respectively of the chain link and the free end portions of the pins alternate being disposed on the first sides of the chain links and being disposed on the second sides of the chain links along the loop.

\* \* \* \* \*